United States Patent [19]
Kitasagami

[11] Patent Number: 5,812,295
[45] Date of Patent: Sep. 22, 1998

[54] OPTICAL SUBSCRIBER TRANSMISSION SYSTEM AND SUBSCRIBER UNIT USED IN SUCH

[75] Inventor: Hiroo Kitasagami, Kawasaki, Japan

[73] Assignee: Fujitsu Limited, Kanagawa, Japan

[21] Appl. No.: 342,310

[22] Filed: Nov. 18, 1994

[30] Foreign Application Priority Data

Mar. 17, 1994 [JP] Japan .................................. 6-047540

[51] Int. Cl.$^6$ ................................................ H04B 10/00
[52] U.S. Cl. ........................ 359/167; 359/110; 359/118; 359/164; 359/187; 455/69
[58] Field of Search .................... 359/110, 118, 359/120–121, 125, 137, 153, 164, 167, 194, 187, 171; 370/94.3, 230, 236; 375/317; 455/68, 69

[56] References Cited

U.S. PATENT DOCUMENTS

| | | | |
|---|---|---|---|
| 4,801,190 | 1/1989 | Imoto | 359/164 |
| 5,265,119 | 11/1993 | Gilhousen et al. | 455/69 |
| 5,341,365 | 8/1994 | Clarke | 359/110 |

FOREIGN PATENT DOCUMENTS 3104434  5/1991  Japan .

*Primary Examiner*—Wellington Chin
*Attorney, Agent, or Firm*—Helfgott & Karas, P.C.

[57] ABSTRACT

An optical subscriber transmission system is formed of an office center unit and a plurality of subscriber units connected to the office center unit in parallel via an optical fiber, in which system a downward signal is transmitted from the office center unit to the plurality of subscriber units via the optical fiber and upward signals are transmitted from the plurality of subscriber units to the office center unit. The optical subscriber transmission system includes a signal level detecting unit for detecting a level of the downward signal from the office center unit which is received by a subscriber unit, and a control circuit for controlling, based on a detected signal level obtained by the signal level detecting unit, an upward signal to be transmitted from the subscriber unit to the office center unit so that a level of the upward signal is decreased in accordance with an increasing of the detected signal level.

8 Claims, 12 Drawing Sheets

OPTICAL SUBSCRIBER TRANSMISSION SYSTEM AND SUBSCRIBER UNIT USED IN SUCH

BACKGROUND OF THE INVENTION (1) Field of the Invention

The present invention generally relates to an optical subscriber transmission system and a subscriber nit used therein, and more particularly to an optical subscriber transmission system having a plurality of subscriber units connected to an office central unit, in an optical subscriber network, by transmission lines formed of optical fibers, and a subscriber unit.

(2) Description of Related Art

An optical subscriber transmission system in an optical transmission network is formed, for example, as shown in FIG. 1. In FIG. 1, a predetermined number of subscriber units 4(#1), 4(#2), 4(#3), . . . are connected to an office central unit 1 via an optical fiber 5 and a star-coupler 2 having branches (e.g. the number of branches falls within a range of between eight and sixteen). In this optical subscriber transmission system, as shown in FIG. 2, a downward signal (a burst signal) is transmitted from the office center unit 1 to the respective subscriber units 4(#1), 4(#2), 4(#3), . . . in the first half of one transmission period t. In the second half thereof, upward signals (burst signals) are transmitted from the respective subscriber units 4(#1), 4(#2), 4(#3), . . . , which have received the downward signal, to the office center unit 1. An optical receiver circuit in the office center unit 1 identifies the respective subscriber units based on the received upward signals.

In the optical subscriber transmission system as described above, distances between the office center unit 1 and the respective subscriber units 4(#1), 4(#2), 4(#3), . . . differ from each other, so that amounts of losses of optical signals from the respective subscriber units differ from each other. Thus, the levels of the optical signals from the respective subscriber units received by the office center unit 1 differ from each other (e.g. the maximum level is twenty times as large as the minimum level). As a result, the level of the signals corresponding to the respective subscriber units must be controlled by an AGC circuit which can rapidly respond to input signals.

However, it is difficult to actually make the AGC circuit which can sufficiently respond to the signals from the respective subscriber units.

SUMMARY OF THE INVENTION

Accordingly, a general object of the present invention is to provide an optical subscriber transmission system and a subscriber unit used therein, in which the disadvantages of the aforementioned prior art are eliminated.

A more specific object of the present invention is to provide an optical subscriber transmission system in which the office center unit can sufficiently identify optical signals from the respective subscriber units without having to provide an AGC circuit capable of rapidly responding to the input optical signals.

The objects of the present invention are achieved by an optical subscriber transmission system having a plurality of subscriber units connected to a center unit in parallel via an optical fiber, in which a downward signal is transmitted from the center unit to the plurality of subscriber units via the optical fiber and upward signals are transmitted from the plurality of subscriber units to the center unit, the optical subscriber transmission system comprising: signal level detecting means for detecting a level of the downward signal from the center unit which is received by a subscriber unit; and output control means for controlling, based on a detected signal level obtained by the signal level detecting means, an upward signal to be transmitted from the subscriber unit to the center unit so that a level of the upward signal is decreased in accordance with increasing of the detected signal level.

According to the present invention, in each subscriber unit, the upward signal to be transmitted to the center unit is controlled based on the detected signal level from the signal level detecting means so that the level of the upward signal is decreased in accordance with an increase in the detected signal level. As a result, even if there are various distances between the subscriber units and the center unit, the difference between the levels of the upward signals detected by the center unit is small. Thus, the center unit can separately detect light signals from the respective subscriber units without the AGC circuit capable of rapidly responding to the light signals.

Another object of the present invention is to provide a subscriber units used in the above optical subscriber transmission system.

The object of the present invention is achieved by a subscriber unit used in an optical subscriber transmission unit having a plurality of subscriber units connected to a center unit in parallel via an optical fiber, in which a downward signal is transmitted from the center unit to the plurality of subscriber units via the optical fiber and upward signals are transmitted from the plurality of subscriber units to the center unit, the subscriber unit comprising: signal level detecting means for detecting a level of the downward signal from the center unit; and output control means for controlling, based on a detected signal level obtained by the signal level detecting means, an upward signal to be transmitted from the subscriber unit to the center unit so that a level of the upward signal is decreased in accordance with increasing of the detected signal level.

DESCRIPTION OF THE PREFERRED EMBODIMENTS

Other objects, features and advantages of the present invention will become apparent from the following detailed description when read in conjunction with the accompanying drawings, in which.

DESCRIPTION OF THE PREFERRED EMBODIMENTS

A description will be given of an optical subscriber transmission system according to an embodiment of the present invention.

Figure 1:
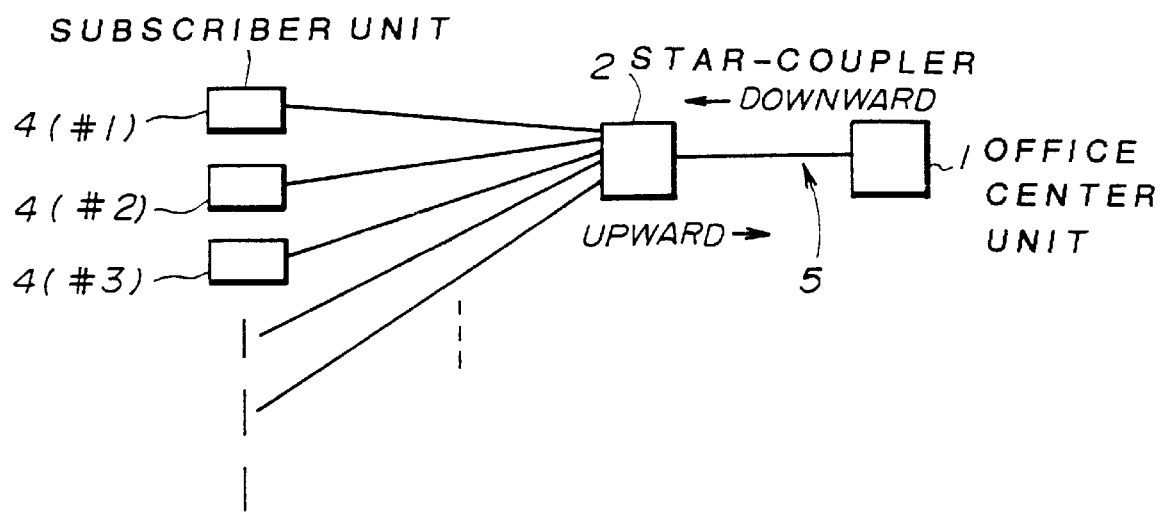
FIG. 1 is a block diagram illustrating a conventional optical subscriber transmission system.
Figure 2:
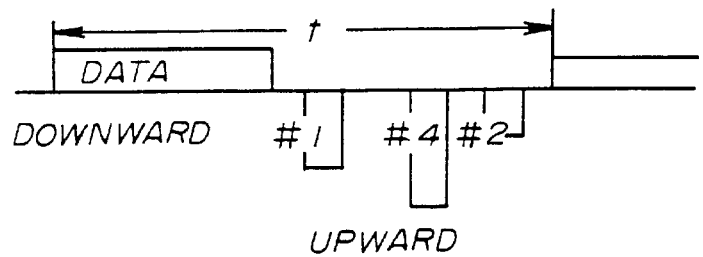
FIG. 2 is a timing chart illustrating a downward signal and upward signals transmitted in the conventional optical subscriber transmission system.
Figure 3:
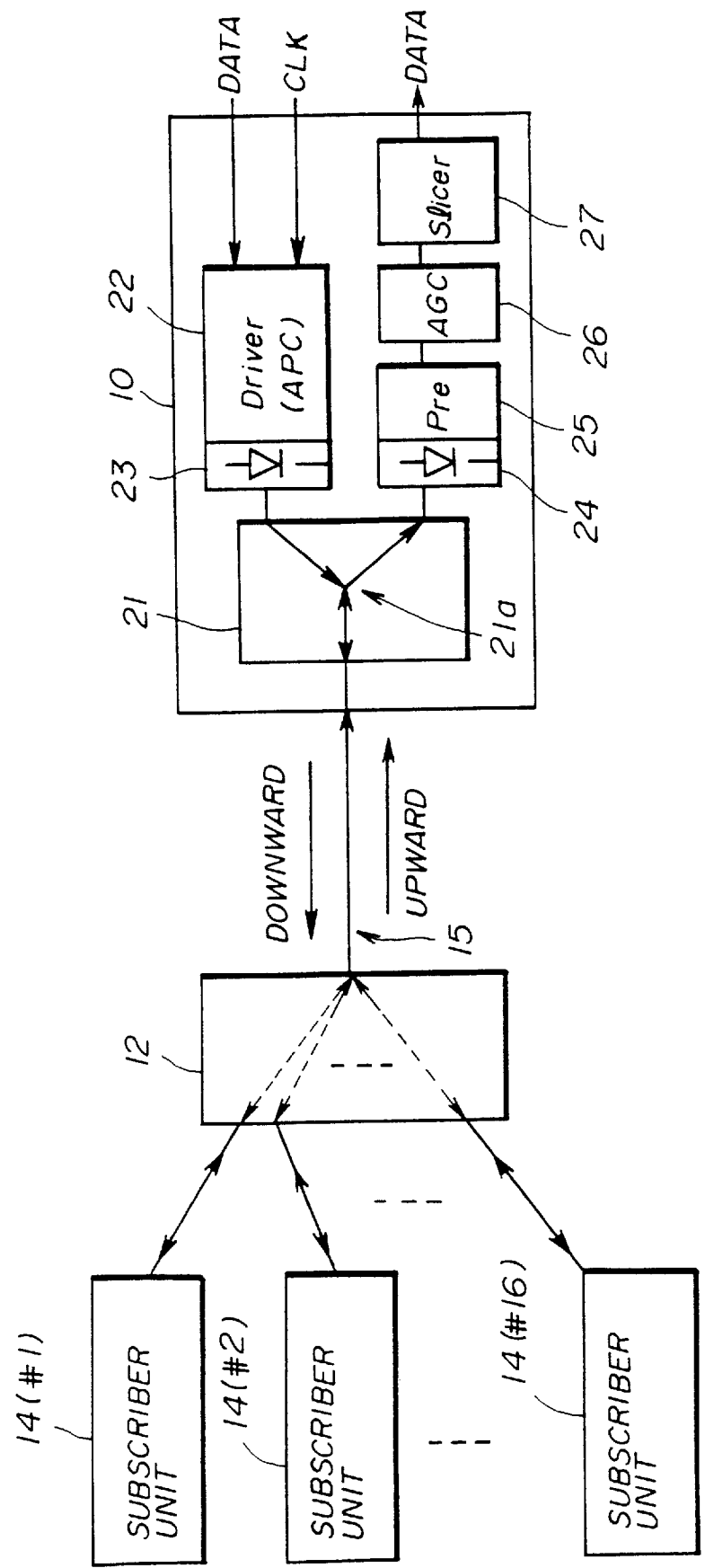
FIG. 3 is a block diagram illustrating an optical subscriber transmission system according to an embodiment of the present invention.
Figure 4:
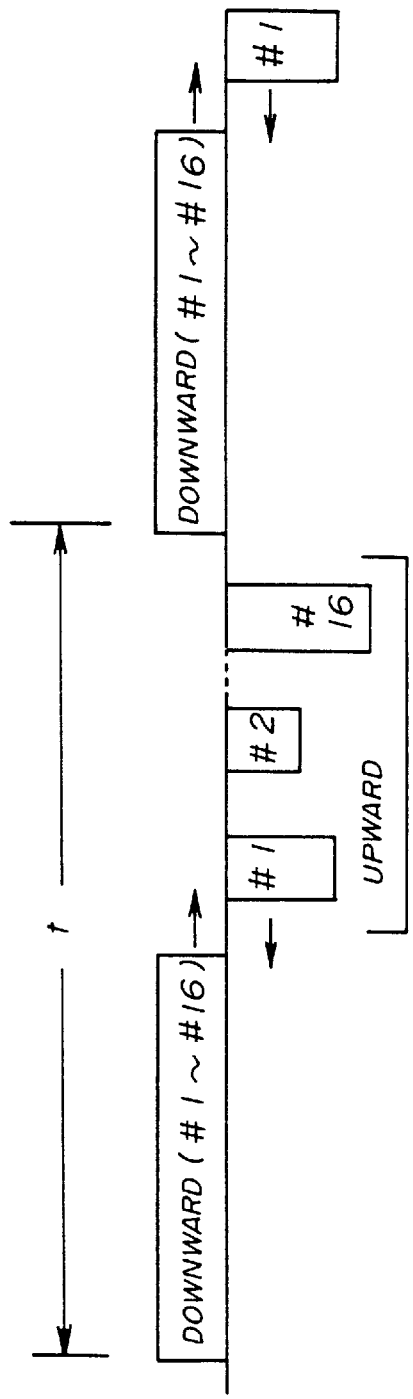
FIG. 4 is a timing chart illustrating downward signals and upward signals transmitted in the optical subscriber transmission system shown in FIG. 3.
Figure 5:
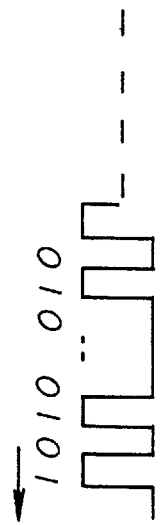
FIG. 5 is a wave form chart illustrating a bit sequence of each of the upward signals and the downward signals.

FIG. 3 shows an essential structure of an optical subscriber transmission system. Referring to FIG. 3, sixteen subscriber units 14 (#1), 14(#2), 14(#3), . . . are connected to an office center unit 10 via an optical fiber 15 and a star coupler (1:16) 12 having sixteen branches, in the same manner as those shown in FIG. 1. In such an optical subscriber transmission system, the downward signals (the burst signals) are transmitted from the office center unit 10 to the respective subscriber units 14(#), 14(#2), 14(#3), . . . in the first half of each transmission period t, and the upward signals (the burst signals) are transmitted from the respective subscriber units 14(#1), 14(#2), 14(#3), . . . to the office center unit 10 in the second half of each transmission period t, as shown in FIG. 4 (in the same manner as those shown in FIG. 2). The upward signals from the respective subscriber units 14(#1), 14(#2), 14(#3), . . . are serially transmitted as shown in FIG. 5.

The office center unit 10 has a wave guide unit 21, a driver circuit 22, a laser diode 23, a photo detector 24, a preamplifier 25, an AGC circuit 26 and a slicer circuit 27. The driver circuit 22 drives the laser diode 23 based on transmission data (DATA) and a clock signal (CLK) so that the laser diode 23 outputs a light signal corresponding to the transmission data (DATA). The wave guide unit 21 has a photo coupler 21a. The light signal output from the laser diode 23 passes through the photo coupler 21a of the wave guide unit 21 and is output as the downward signal from the office center unit 10. A light signal transmitted through the optical fiber 15 is incident on the wave guide unit 21. The light signal incident on the wave guide unit 21 passes through the photo coupler 21a and is received by the photo detector 24. A photoelectric conversion signal output from the photo detector 24 is supplied to the slicer circuit 27 via the preamplifier 25 and the AGC circuit 26. The slicer circuit 27 converts an input signal into a binary signal by using a predetermined slice level, and the binary signal output from the slicer circuit 27 is processed as the received data (DATA) in the office center unit 10.

Figure 6:
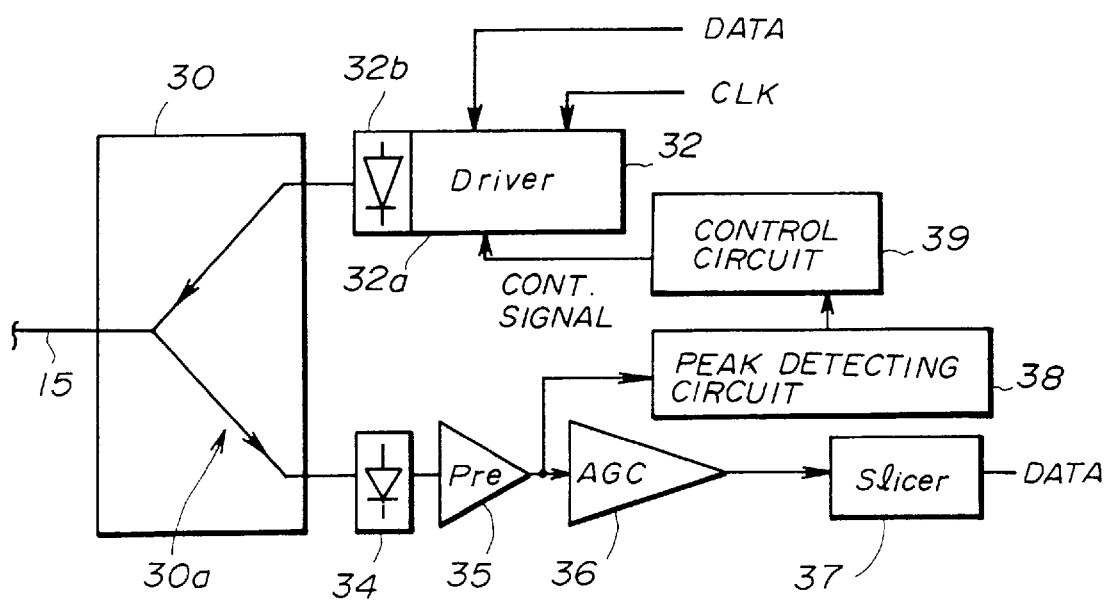
FIG. 6 is a block diagram illustrating the structure of a subscriber unit in the system shown in FIG. 3.

Each of the subscriber units 14(#1), 14(#2), 14(#3), . . . is formed, for example, as shown in FIG. 6.

Referring to FIG. 6, a subscriber unit has a wave guide unit 30, a transmission unit 32, a photo detector 34, a preamplifier 35, an AGC circuit 36 and a slicer circuit 37. The transmission unit 32 has a driver circuit 32a and a laser diode 32b, the driver circuit 32a driving the laser diode 32b based on transmission data (DATA) and a clock signal (CLK). A light signal from the laser diode 32b passes through a photo coupler 30a of the wave guide unit 30 and is output from the wave guide 30 to the optical fiber 15 as the upward signal. A light signal (the downward signal) transmitted through the optical fiber 15 passes through the photo coupler 30a of the wave guide 30 and is incident on the photo detector 34. A photoelectric conversion signal from the photo detector 34 is supplied to the slicer circuit 37 via the preamplifier 35 and the AGC circuit 36. The slicer circuit 37 converts an input signal into a binary signal by using a predetermined slice level, and the binary signal is processed as a received signal in the subscriber unit.

Figure 7:
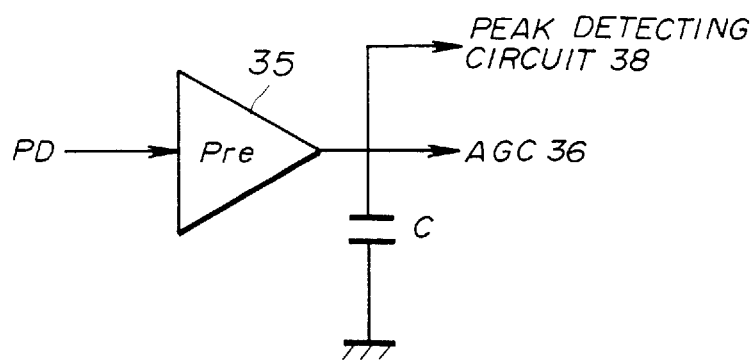
FIG. 7 is a circuit diagram illustrating a peak detecting circuit in the subscriber unit shown in FIG. 6.
Figure 8:
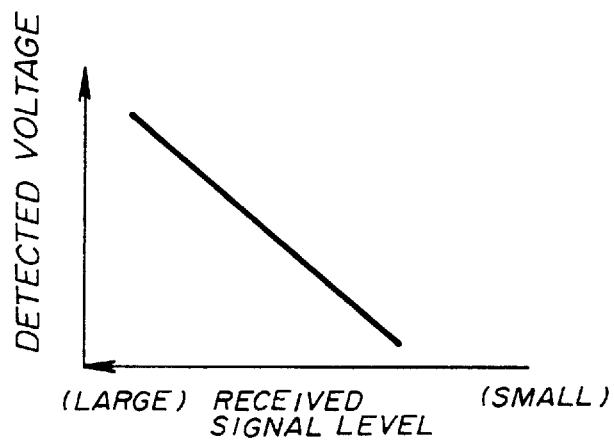
FIG. 8 is a graph illustrating a relationship between the level of a received signal and a detected voltage.
Figure 9:
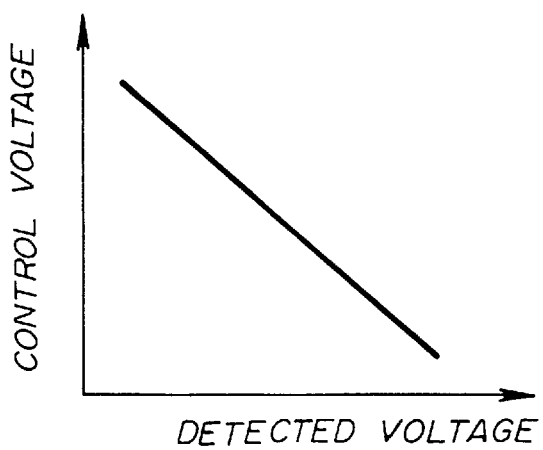
FIG. 9 is a graph illustrating a relationship between the detected voltage and a control voltage.

The subscriber unit also has a peak detecting circuit 38 and a control circuit 39. The peak detecting circuit 38 is connected to the preamplifier 35 and detects a peak level of a received signal output from the preamplifier 35. The peak detecting circuit 38 is formed, for example, of a capacitor C as shown in FIG. 7. That is, the peak level of the received signal from the preamplifier is held in the capacitor C. There is a relationship as shown in FIG. 8 between a detected voltage (the peak level) from the peak detecting circuit 38 and the level of the received signal. That is, the detected voltage (the peak level) is increased in accordance with an increasing of the level of the received signal. The control circuit 39 outputs a control signal corresponding to the detected voltage from the peak detecting circuit 38. The control circuit 39 has a voltage conversion circuit having an input-output characteristic by which the level of the control signal (a control voltage) is decreased in accordance with an increasing of the detected voltage, as shown in FIG. 9.

Figure 10:
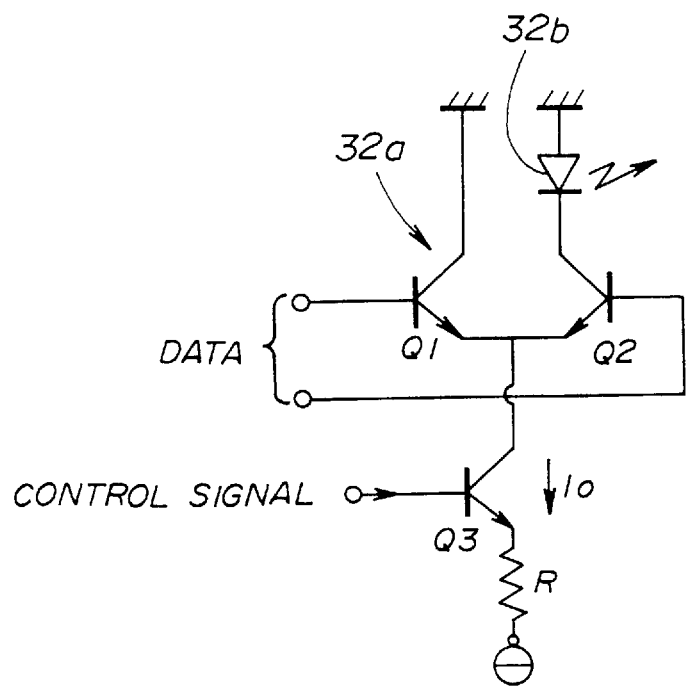
FIG. 10 is a circuit diagram illustrating a driver circuit.
Figure 11:
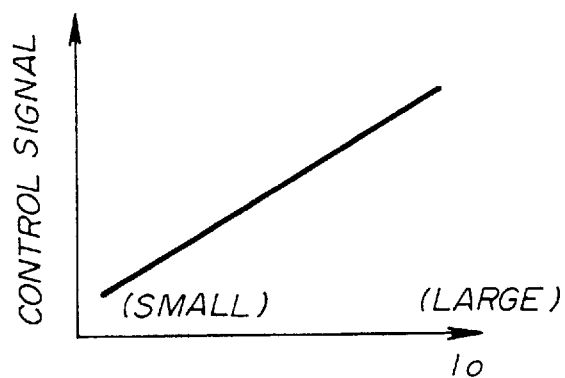
FIG. 11 is a graph illustrating a relationship between a value of a current Io and the control voltage.
Figure 12:
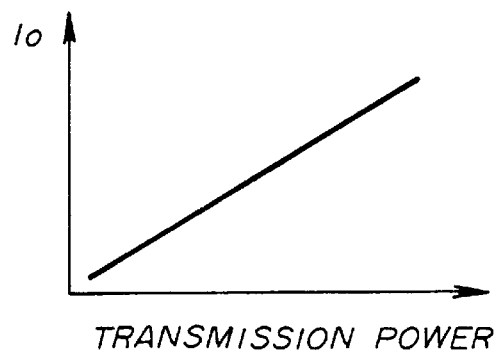
FIG. 12 is a graph illustrating the current Io and a transmission power.

The transmission unit 32 is formed, for example, as shown in FIG. 10. Referring to FIG. 10, the driver circuit 32a has transistors Q1, Q2 and Q3. The transmission data (DATA) is applied across base terminals of the transistors Q1 and Q2. A current through the laser diode 32b connected to the transistor Q2 is controlled in accordance with the transmission data. The transistor Q3 functions as a constant current source. Due to the operation of the transistor Q3, a current Io depending on the level of the control signal input to a base terminal of the transistor Q3 is supplied from emitter terminals of the transistors Q1 and Q2 to a minus power line (–) via a resistor R. There is a relationship as shown in FIG. 11 between the level of the control signal (the control voltage) and the current Io generated by the transistor Q3. That is, the current Io is increased in accordance with an increasing of the control voltage. In a relationship between the current Io and the transmission power of the light signal transmitted by the laser diode 32b, the transmission power is increased in accordance with an increasing of the current Io, as shown in FIG. 12.

According to the optical subscriber transmission system in which the respective subscriber units 14(#1), 14(#2), 14(#3), . . . are formed as described above, when the level of the signal (the downward signal) transmitted from the office center unit 10 and received by a subscriber unit is high, the transmission power is controlled so as to be lowered in the subscriber unit (a linear relationship). On the other hand, when the level of the received signal (the downward signal) is low, the transmission power is controlled to be enlarged in the subscriber unit. That is, since the level of the received downward signal in a subscriber unit far away from the office center unit 10 is low, the transmission power of the upward signal from the subscriber unit is controlled so as to be enlarged. On the other hand, since the level of the received downward signal in a subscriber unit near the office center unit 10 is high, the transmission power of the upward signal from the subscriber unit is controlled so as to be lowered. As a result, the levels of the upward signals received by the office center unit 10 are approximately constant.

In this office center unit 10, since the levels of the upward signals from the respective subscriber units 14(#1), 14(#2), 14(#3), . . . are approximately constant, it is not necessary to provide an AGC circuit which can rapidly respond to variations in the level of the received upward signal.

Figure 13:
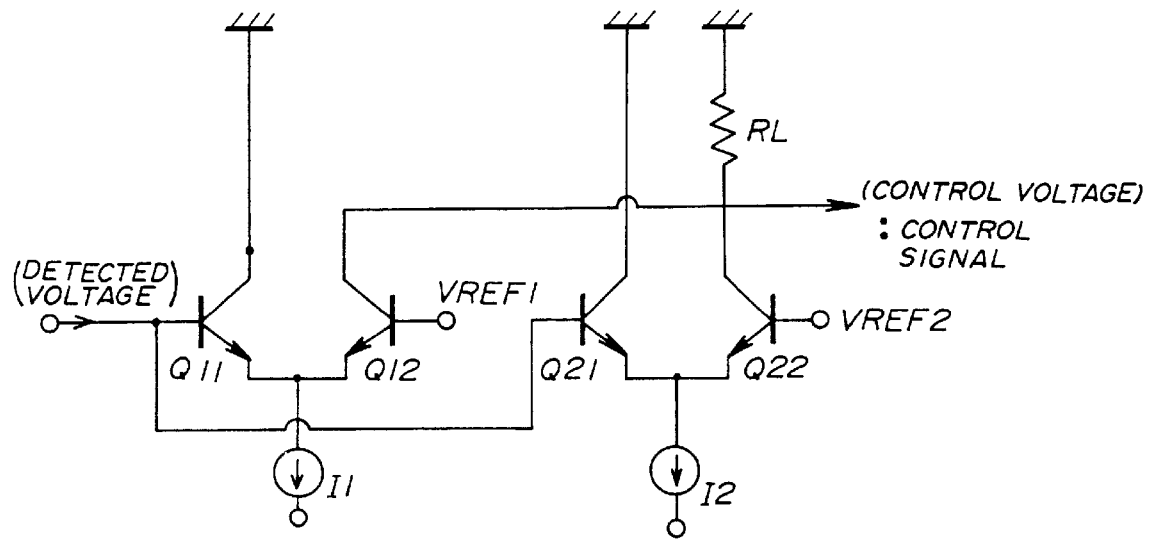
FIG. 13 is a circuit diagram illustrating an example of a control circuit.

The control circuit 39 may be formed as shown in FIG. 13.

Referring to FIG. 13, the control circuit 39 has transistors Q11, Q12, Q21 and Q22 and two constant current sources I1 and I2. The transistors Q11 and Q12 and the constant current source I1 form a first comparator. The first comparator compares a detected voltage from the peak detecting circuit 38 with a first reference voltage Vref1 supplied from an external circuit (not shown). When the detected voltage is greater than the first reference voltage Vref1, the first comparator outputs a large voltage corresponding to a current value I1 of the constant current source I1. The transistors Q21 and Q22 and the constant current source I2 form a second comparator. The second comparator compares the detected voltage from the peak detecting circuit 38 with a second reference voltage Vref2 supplied from the external circuit (not shown). When the detected voltage is greater than the second reference voltage Vref2, the second comparator outputs a large voltage corresponding to a current value I2 of the constant current source I2.

Figure 15A:
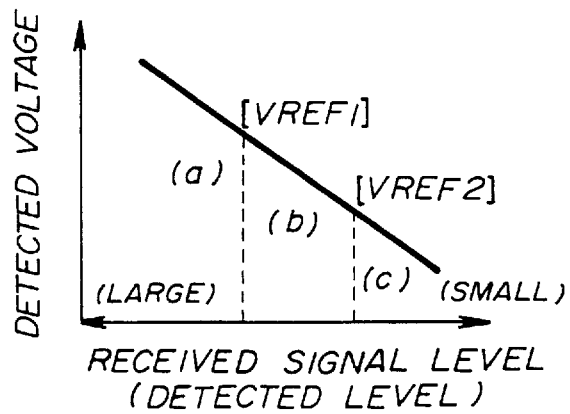
FIG. 15A is a graph illustrating a relationship between the detected voltage and the level of the received signal.
Figure 15B:
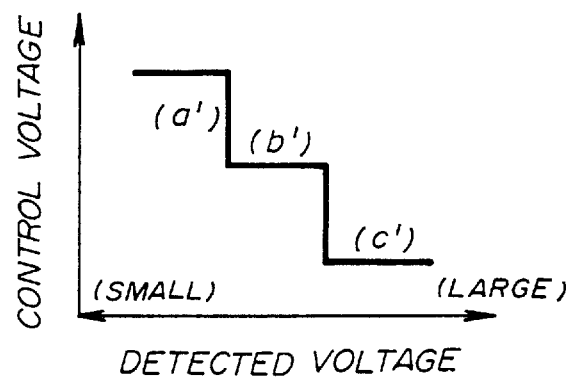
FIG. 15B is a graph illustrating a relationship between the control voltage and the detected voltage.
Figure 15C:
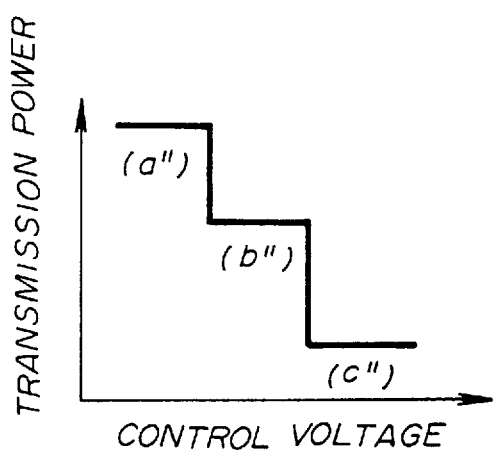
FIG. 15C is a graph illustrating a relationship between the transmission power and the control voltage.

A relationship between the level of a received signal and the detected voltage in the peak detecting circuit is shown in FIG. 15A (the same as that shown in FIG. 8). The first reference voltage Vref1 is greater than the second reference voltage Vref2. Thus, when the detected voltage V is within a region (a) greater than the first reference voltage Vref1 (V>Vref1), the control signal has the maximum level; when the detected voltage V is within a region (c) less than the second reference voltage Vref2 (V<Vref2), the control signal has the minimum level; and when the detected voltage V falls within a region (b) between the first reference voltage Vref1 and the second reference voltage Vref2 (Vref2≦V≦Vref1), the control signal has a medium level between the maximum level and the minimum level. Thus, when the driving circuit 32a is controlled by using the control signal which varies in a step like way in accordance with the variation of the level of the detected signal (see FIG. 15B), the transmission power varies in a step like way as shown in FIG. 15C.

In the case where the transmission power is controlled in a step like way in accordance with the level of the received downward signal in each subscriber unit as described above, although the variation of the level of the received upward signal in the office center unit 10 is slightly greater than that in the case of the control characteristic shown in FIGS. 8–12, the laser diode 32b can be stably driven. In addition, in this case, since the dynamic range of the office center unit 10 may be small, a light receiving circuit can be easily made.

Figure 14:
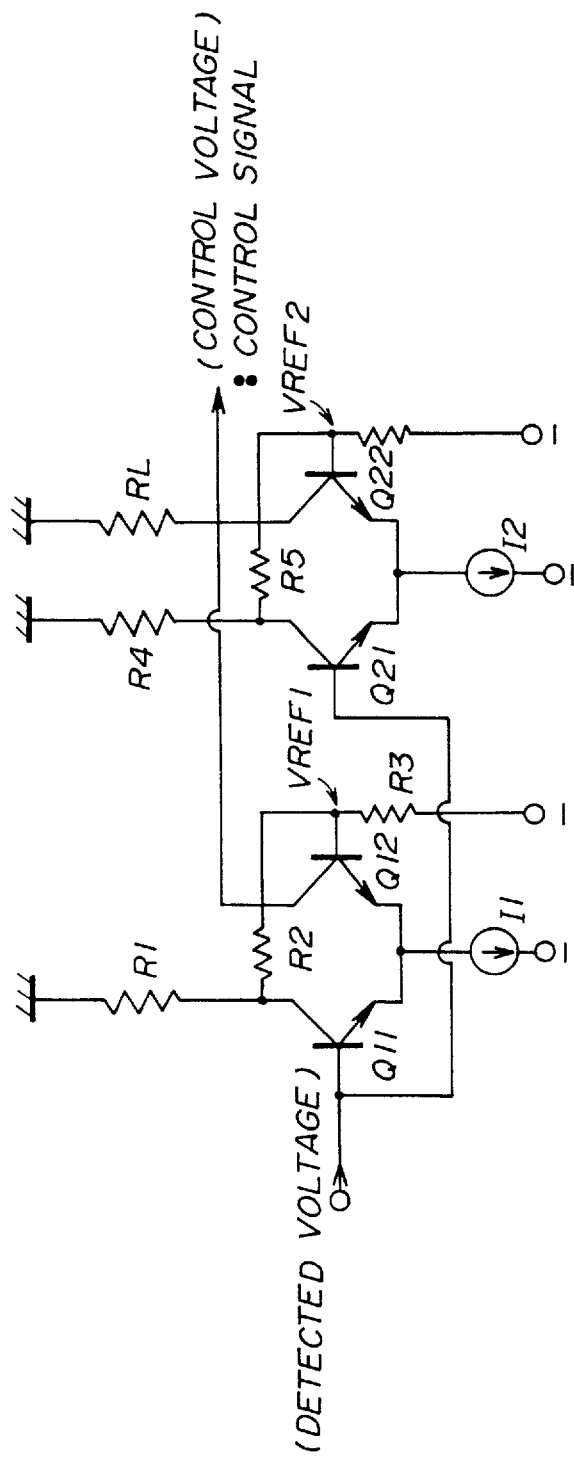
FIG. 14 is a circuit diagram illustrating another example of the control circuit.

The control circuit 39 may also be formed as shown in FIG. 14. In this example, the first reference voltage Vref1 is obtained by resistance voltage division using resistors R1, R2 and R3, and the second reference voltage Vref2 is obtained by resistance voltage division using resistors R4, R5 and R6.

Figure 16:
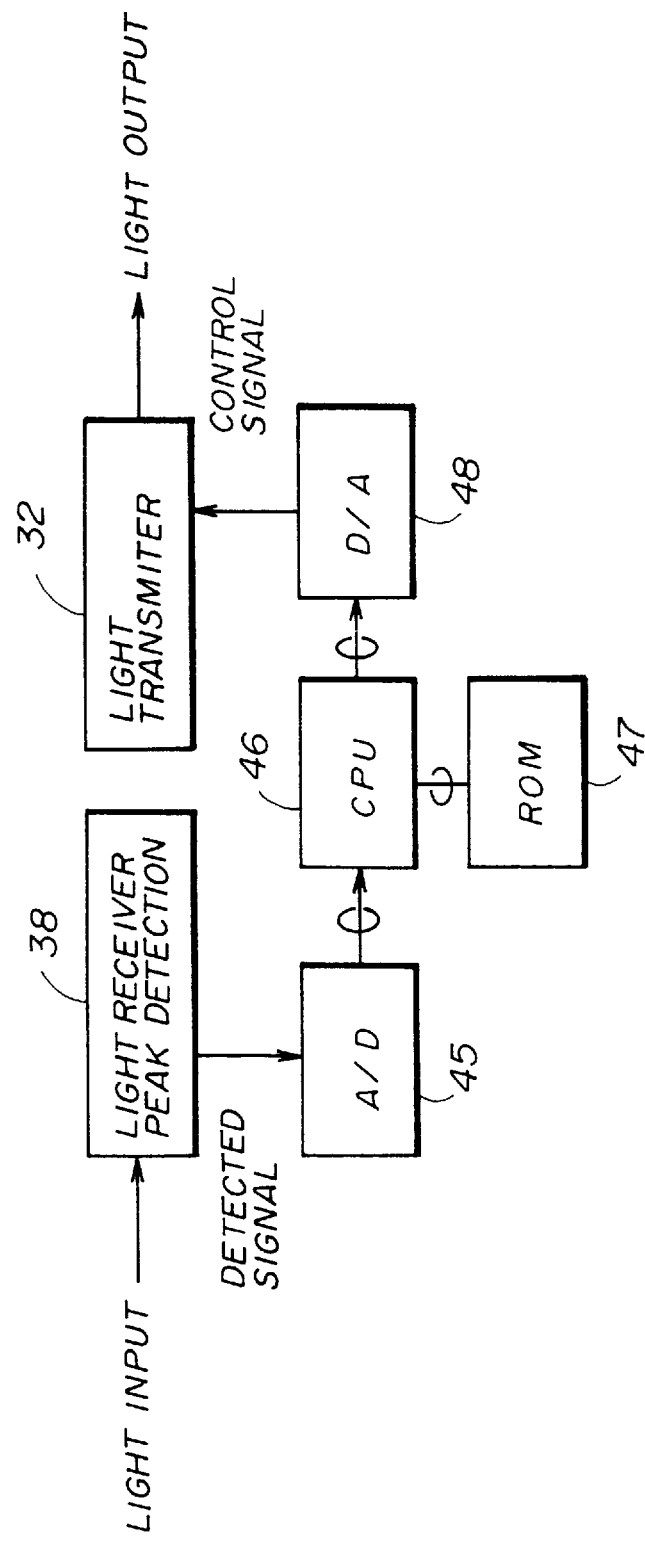
FIG. 16 is a block diagram illustrating another example of a system for controlling the transmission level of the upward signal in the subscriber unit.

Each subscriber unit may be formed as shown in FIG. 16. In this example, the control signal to be supplied to the transmission portion 32 is generated by digital processing.

Referring to FIG. 16, a ROM 47 is provided with a table indicating a relationship between the detected voltage from the peak detecting circuit 38 and the control signal to be supplied to the transmission portion 32 (see FIGS. 8–11 and 13). The detected signal output from the peak detecting circuit 38 is converted into digital data by an analog-to-digital converter (an A/D converter) 45. The digital data from the A/D converter 45 is supplied to a CPU (Central Processing Unit) 46. The CPU 46 retrieves control data corresponding to input detected data with reference to the table in the ROM 47. The retrieved control data is converted into an analog control signal by a digital-to-analog converter 48. The control signal is supplied from the digital-to-analog converter 48 to the transmission portion 32.

Figure 17:
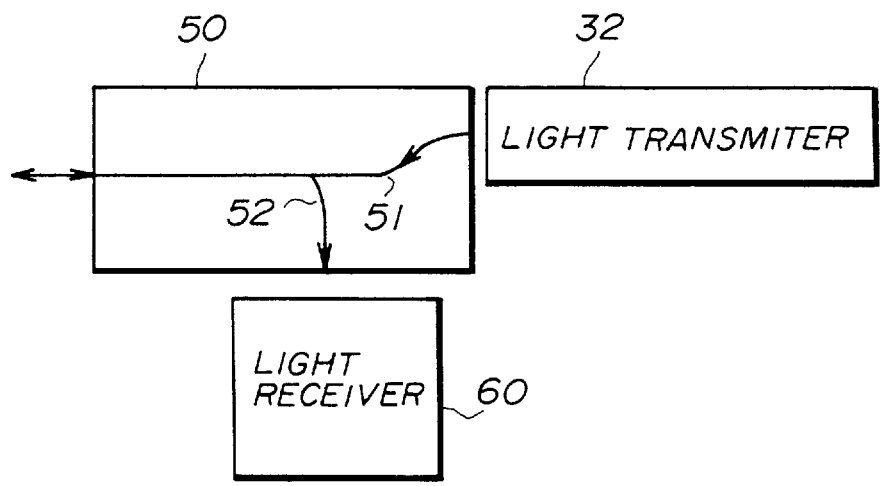
FIG. 17 is a block diagram illustrating still another example of the system for controlling the transmission level of the upward signal in the subscriber unit.

Each subscriber unit may also be formed as shown in FIG. 17.

Figure 18:
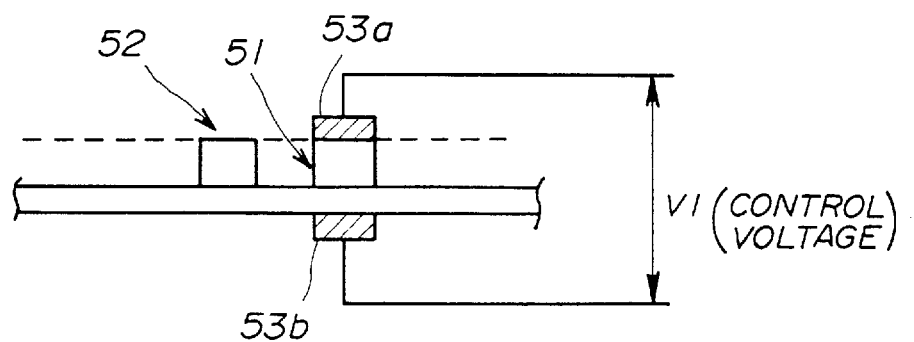
FIG. 18 is a diagram illustrating a mechanism for controlling an electric field of a directional coupler in the system shown in FIG. 17.

Referring to FIG. 17, a directional coupler 50 is substituted for the optical coupler 30 shown in FIG. 6. The directional coupler 50 has a first branch path 51 (a wave guide) and a second branch path 52 (a wave guide). The first branch path 51 is connected to the transmission portion 32. The second branch path 52 is connected to a receiving portion 60 including the photo detector. A curved portion of the first branch path 51 is sandwiched between electrodes 53a and 53b as shown in FIG. 18. The control voltage V1 from the control circuit 39 is applied across the electrodes 53a and 53b. Due to variation of the control voltage V1, the electric field in the first branch path 51 is varied. The refractive index of the first branch path 51 is varied by the variation of the electric field. As a result, a loss in the first branch path 51 is controlled by the control voltage V1.

Figure 19B:
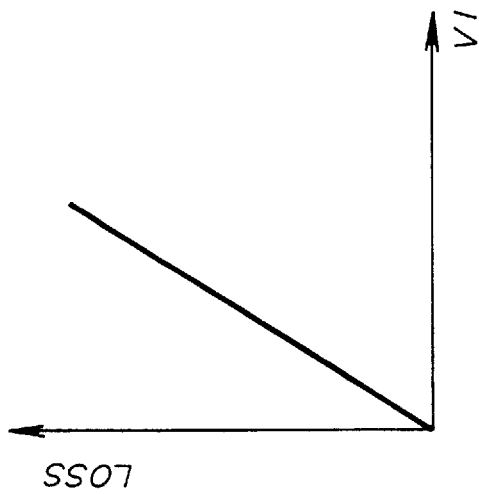
FIG. 19B is a graph illustrating a relationship between the loss of light in the directional coupler and the control voltage (V1).
Figure 19A:
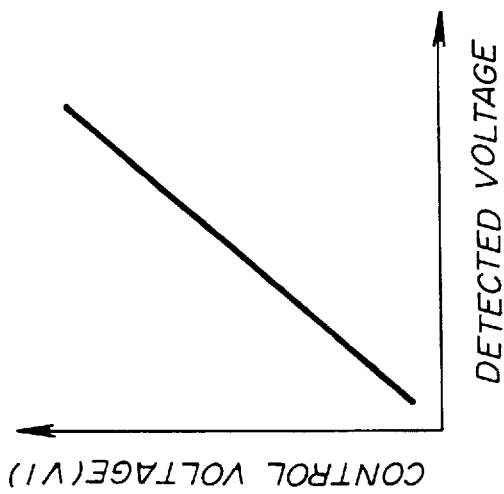
FIG. 19A is a graph illustrating a relationship between the control voltage (V1) and the detected voltage.

A relationship between the detected voltage from the peak detecting circuit 38 and the control voltage output from the control circuit 39 is shown, for example, in FIG. 19A. Referring to FIG. 19A, the control voltage V1 is increased in accordance with an increasing of the level of the detected voltage. A relationship between the control voltage V1 and the loss in the first branch path 51 is shown in FIG. 19B. Referring to FIG. 19B, the loss is increased in accordance with increasing of the control voltage V1.

In the subscriber unit described above, when the downward signal from the office center unit 10 is large (the detected voltage is large), the control voltage is large so that the loss in the first branch path 51 is large. As a result, the transmission power of the subscriber unit is small. On the other hand, when the downward signal from the office center unit 10 is small so that the level of the received signal in the subscriber unit is small, the control voltage is small so that the loss in the first branch 51 is small. As a result, the transmission power of the subscriber unit is large. According to the above control process, the upward signal received by the office center unit 10 can be maintained at an approximately constant level.

The present invention is not limited to the aforementioned embodiments, and variations and modifications may be made without departing from the scope of the claimed invention.

What is claimed is:

1. An optical subscriber transmission system having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, each of said plurality of subscriber units comprising:

signal level detecting means for detecting a level of the downward signal received from said center unit; and output control means for controlling, based on a detected signal level obtained by said signal level detecting means, an upward signal to be transmitted to said center unit so that a level of the upward signal is decreased in accordance with an increase of the detected signal level, wherein said output control means has stepping wave form signal generating means for generating a control signal used to control the upward signal so that the level of the upward signal is lowered in a step like way in accordance with an increasing of the detected signal level from said signal detecting means.

2. An optical subscriber transmission system having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, each of said plurality of subscriber units comprising:

signal level detecting means for detecting a level of the downward signal received from said center unit; and output control means for controlling, based on a detected signal level obtained by said signal level detecting means, an upward signal to be transmitted to said center unit so that a level of the upward signal is decreased in accordance with an increase of the detected signal level.

wherein said output control means has storage means for storing a table indicating a relationship between the detected signal level from said level detecting means and a level of the control signal, and processing means for deciding a level of the control signal corresponding to a signal level actually detected by said signal level detecting means with reference to the table stored in said storage means.

3. An optical subscriber transmission system having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, each of said plurality of subscriber units comprising:

signal level detecting means for detecting a level of the downward signal received from said center unit; and output control means for controlling, based on a detected signal level obtained by said signal level detecting means, an upward signal to be transmitted to said center unit so that a level of the upward signal is decreased in accordance with an increase of the detected signal level, wherein the subscriber unit has a transmission portion connected to the optical fiber by a directional coupler, and wherein said output control means has loss control means for controlling loss in said directional coupler so that the loss is increased in accordance with an increasing of the detected signal level from said signal level detecting means.

4. The optical subscriber transmission system as claimed in claim 3, wherein said loss control means has electric field control means for controlling an electric field in a wave guide of said directional coupler, said wave guide being connected to said transmission portion.

5. A subscriber unit used in an optical subscriber transmission unit having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, said subscriber unit comprising:

signal level detecting means for detecting a level of the downward signal received from said center unit; and output control means for controlling, based on a detected signal level obtained by said signal level detecting means, an upward signal to be transmitted from said subscriber unit to said center unit so that a level of the upward signal is decreased in accordance with an increase of the detected signal level, wherein said output control means has stepping wave form signal generating means for generating a control signal used to control the upward signal so that the level of the upward signal is lowered in a step like way in accordance with an increasing of the detected signal level from said signal detecting means.

6. A subscriber unit used in an optical subscriber transmission unit having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, said subscriber unit comprising:

signal level detecting means for detecting a level of the downward signal received from said center unit; and output control means for controlling, based on a detected signal level obtained by said signal level detecting means, an upward signal to be transmitted from said subscriber unit to said center unit so that a level of the upward signal is decreased in accordance with an increase of the detected signal level, wherein said output control means has storage means for storing a table indicating a relationship between the detected signal level from said signal level detecting means and a level of the control signal, and processing means for deciding a level of the control signal corresponding to a signal level actually detected by said signal level detecting means with reference to the table stored in said storage means.

7. A subscriber unit used in an optical subscriber transmission unit having a plurality of subscriber units connected to a center unit in parallel via an optical fiber, in which a downward signal is transmitted from said center unit to said plurality of subscriber units via the optical fiber and upward signals are transmitted from said plurality of subscriber units to said center unit, said subscriber unit comprising:

signal level detecting means for detecting a level of the downward signal received from said center unit; and output control means for controlling, based on a detected signal level obtained by said signal level detecting means, an upward signal to be transmitted from said subscriber unit to said center unit so that a level of the upward signal is decreased in accordance with an increase of the detected signal level, wherein the upward signal is output from a transmission portion to the fiber via a directional coupler, and wherein said output control means has loss control means for controlling loss in said directional coupler so that the loss is increased in accordance with increasing of the detected signal level from said signal level detecting means.

8. The subscriber unit as claimed in claim 7, wherein said loss control means has electric field control means for controlling an electric field in a wave guide of said directional coupler, said wave guide being connected to said transmission portion.

* * * * *